Nov. 7, 1950          R. STROUD          2,528,620

SCREEN VIBRATING MECHANISM

Filed Sept. 24, 1949          2 Sheets-Sheet 1

INVENTOR
ROBERT STROUD.
By
ATTORNEY.

Nov. 7, 1950   R. STROUD   2,528,620
SCREEN VIBRATING MECHANISM
Filed Sept. 24, 1949   2 Sheets-Sheet 2

INVENTOR
ROBERT STROUD.
By
ATTORNEY

Patented Nov. 7, 1950

2,528,620

UNITED STATES PATENT OFFICE 2,528,620

SCREEN VIBRATING MECHANISM

Robert Stroud, Toronto, Ontario, Canada, assignor to Niagara Screens & Machines Limited, York County, Ontario, Canada, a corporation Application September 24, 1949, Serial No. 117,539

8 Claims. (Cl. 74—87)

This invention relates generally to vibrating mechanisms for screens and the like and more particularly relates to a gyrating mechanism which is dynamically balanced about the axis of its supporting bearings during starting and stopping, and in which the balance wheels run true under operating conditions.

An object of this invention is to provide a self-balancing flywheel wherein the automatic adjusting means is easily adjustable to suit a wide variety of conditions.

Another object of this invention is to provide means whereby the automatic adjusting means can be set to pivot about a center very close to the actual center of rotation of the shaft and/or the geometric center of the flywheel.

The features of this invention which are believed to be novel and patentable are pointed out in the appended claims, but for a better understanding of all the foregoing and still further objects of the invention, reference may be had to the following specification and accompanying drawings wherein like characters of reference indicate corresponding parts throughout the several views and wherein:

Figure 5:
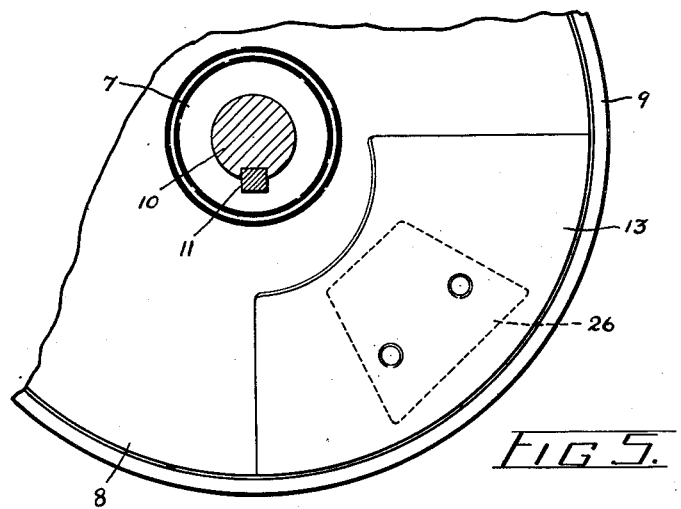
Fig. 5 is a side elevation of a portion of the flywheel shown in Fig. 2 as viewed from the opposite side thereof.
Figure 1:
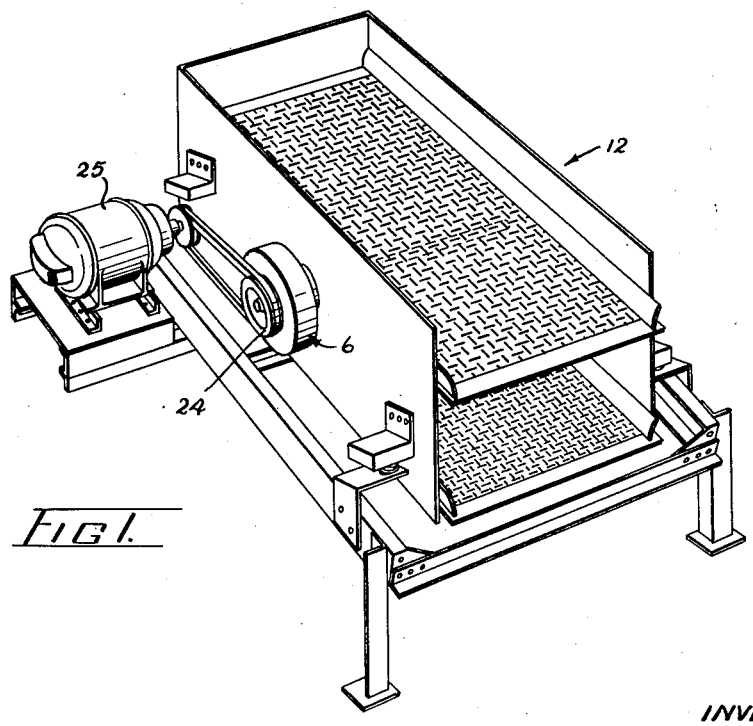
Fig. 1 is a perspective view of a vibrating screen to which a flywheel constructed according to this invention is applied.

Referring to all the figures, a flywheel indicated generally as 6 has a hub 7, a web 8 and a peripheral rim 9. The flywheel is keyed to a straight shaft 10 by a key 11, the shaft extending through and being journalled in the resiliently supported vibrating screen indicated generally as 12.

United States Patent No. 2,403,502 to E. B. Cook explains the operation of a device such as that of the applicant, and therefore a detailed description need not be entered into herein. The subject matter of the present invention comprises an improvement in the arrangement of the weights in the flywheel in order that a smooth automatic balancing of the flywheel and vibrating screen mechanism is achieved at a speed above the resonant frequency of the resiliently supported mechanism.

The flywheel is bored to pass the shaft 10, with a hole through the hub 7 offset slightly from the geometric center of the flywheel. The flywheel is provided with a fixed weight 13, on what may be termed the rear side of the flywheel (see Fig. 5), positioned at a point on the side of the geometric center remote from the center of the hole through which the shaft passes.

Figure 3:
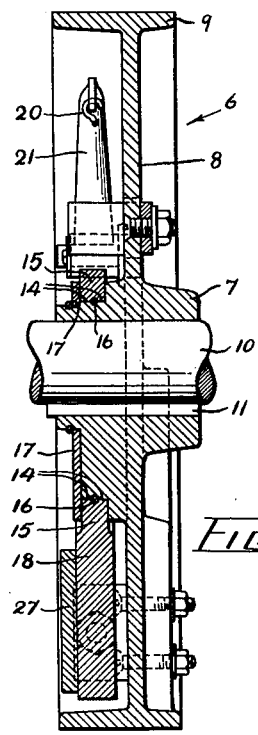
Fig. 3 is a section on the line 3—3 in Fig. 2.
Figure 4:
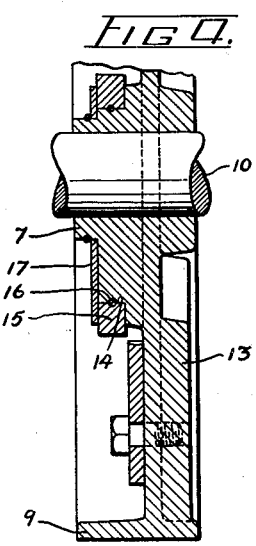
Fig. 4 is a section of the flywheel on the line 4—4 in Fig. 2.

A circular eccentric disk 14 is machined on what may be termed the front side of the hub of the wheel, the center of the disk being offset from the geometric center of the wheel on the side thereof remote from the axis of shaft 10. A collar 15 is slidably mounted upon disk 14, the sliding surfaces of both being provided with lubricating means such as an oil channel 16 as shown in Figs. 3 and 4. A keeper plate 17 retains the collar on the disk but does not prevent the collar from rotating easily thereon.

A movable weight 18 having a mass approximately equal to that of the fixed weight 13 and being shaped as an approximately right angular sector of an annulus, is secured to collar 15 and is rotatable within wheel 6 by virtue of the slidability of collar 15 upon disk 14.

Figure 2:
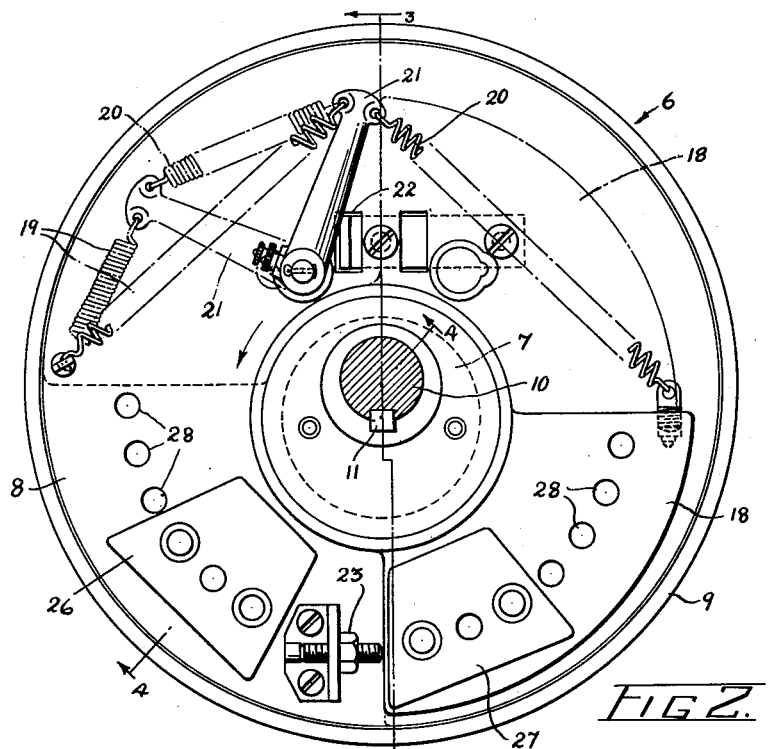
Fig. 2 is a side elevation of such a flywheel, illustrating the positions of the mechanism therein when the flywheel is both stopped and rotating at normal speed.

A pair of helical springs 19 and 20 are connected in series between the weight 18 and the wheel 6 and normally urge the movable weight to the retracted position within wheel 6 shown in broken lines in Fig. 2. It will be evident that in this retracted position, since the masses of weights 13 and 18 are approximately the same, the system will be approximately balanced about the axis of the journalled portion of the shaft. A link 21 is pivotally supported at one end on web 8 and at its other end is secured at the junction of the springs 19 and 20, thereby maintaining the springs in relative angular position so that a maximum movement of weight 18 can be obtained without causing the springs to bear against the collar. Stops 22 and 23 are provided on web 8 in order to limit the travel of the movable weight to approximately 90°.

When the device is not in operation, that is to say when wheel 6 is not rotating, the weight or mass 18 is held in retracted position by the springs 19 and 20 as shown by the broken lines in Fig. 2, and the system is substantially balanced about the axis of the journalled portion of the shaft. A sheave 24 is mounted concentrically with the wheel and is coupled to a motor 25 by a V-belt. As the wheel begins to be rotated by the driving motor 25, it rotates not about its geometric center but rather about the axis of the journalled portion of shaft 10. The natural or resonant frequency of vibration of the resiliently supported system is designed to be sufficiently low that it is passed through while the flywheel is in its mass-balanced condition about the journalled axis so that the screen remains substantially stationary with the flywheel rotating about an axis slightly different from its geometric or true center. This of course produces a certain amount of vibration and stress in the driving belt connecting the motor and the flywheel, but this stress is comparatively small in relation to that which could be set up in the system if the vibrating screen were in oscillation as it passed through its resonant frequency.

As the speed of rotation of the flywheel increases beyond the resonant frequency referred to above, a point is reached at which the centrifugal force on mass 18 overcomes the restraining influence of springs 19 and 20 and the weight 18 begins to move within the wheel by virtue of the fact that collar 15 is slidably mounted on disk 14. The movement is of course due to the fact that the center of the circular disk 14 is offset with respect to the axes of the shaft 10 and the wheel 6.

As the weight 18 progressively moves outwardly with the continued increase in the speed of the wheel, it will be seen that it moves around toward the same side of the wheel as that of the fixed weight 13 so that the two weights in combination move the effective mass-center of the flywheel to a position on the side of the geometric center thereof remote from the journalled axis of the shaft. The weights are so designed that the center of gravity of the flywheel is displaced by such an amount when the movable weight is in its outer position adjacent the fixed weight that the moment of the rotating system about the geometric axis of wheel 6 is equal and opposite to the movement of the vibrated body about the same axis. This being the case at the normal operating speed, wheel 6 rotates about its geometric axis, and shaft 10, journalled within screen 12, gyrates about the same axis. Consequently, during operation at such normal speed the screen rapidly vibrates in the desired manner. It will be evident that since at this normal speed the wheel rotates about its geometric axis it runs true and no vibration is transmitted to the belt drive.

In deceleration or stopping, the sequence of events is the opposite. The movable weight or mass 18 moves to its inner or retracted position, due to the action of springs 19 and 20, before the resonant speed is reached, and the screen thereupon stops vibrating. From that time until the system stops rotating, wheel 6 rotates about the axis of the journalled portion of the shaft 10 and the screen remains stationary, no excessive vibration of the screen being produced as the resonant frequency thereof is passed.

In order to allow one size of flywheel to be applicable to a number of sizes and varieties of screens 12, additional weights 26 and 27 may be attached to fixed weights 13 and 18 respectively, the actual positions thereon being adjustable by providing a plurality of tapped holes 28 within which threaded screws extending through the weights may engage.

It will be evident that by arranging the movable weight on a disk which is eccentrically arranged as above described a rugged dependable construction is provided which may have very small eccentricity from the geometric axis of the system and which is therefore applicable to high speed machinery.

To those skilled in the art it will be seen that the flywheel could be constructed and machined in such a manner that the fixed weight 8 could be dispensed with entirely by merely increasing the eccentricity of the axis of the shaft 10 from the geometric center of the flywheel by a proportionate amount.

While two movable weights mounted by the means disclosed herein could be used, it is preferred to utilize a single movable weight with a fixed weight or equivalent since it has been found that if two weights swinging in opposite directions are used one weight tends to lag behind the other owing to its inertia thus causing a condition of unbalance at certain speeds.

It will be noted that, as described in the specification and shown in the drawings, the shaft 10 is a straight shaft on which the flywheel 6 is eccentrically mounted. The position and extent of the eccentricity of the shaft with respect to the geometric center of the flywheel is automatically provided by positioning the eccentric hole in the flywheel for reception of the straight shaft. If the flywheel construction were used with an eccentric shaft rather than with a straight shaft, it would be necessary to properly position the axis of the journalled portion of the eccentric shaft with respect to the weights in the flywheel and to the geometric center of the flywheel. Obviously such an operation is difficult to perform accurately by a person other than one skilled in the operation and maintenance of such machines, and it is therefore of great advantage to use a straight shaft. Hence the mechanism is rendered more versatile and more easily serviceable.

It is thought that the construction and use of the invention will be apparent from the above description of the various parts and their purposes. It is to be understood that the form of the invention herewith shown and described is to be taken as a preferred example of the same and that various changes in the space, size and arrangement of parts may be resorted to, without departing from the spirit of the invention or the scope of the subjoined claims.

What I claim as my invention is:

1. Screen vibrating mechanism comprising a driving shaft, a flywheel on the shaft, a circular disk, fixed relatively to the flywheel and surrounding the shaft, the geometrical axis of the disk being eccentric of the geometrical axis of the shaft, a slidable collar on the disk, a mass attached to the collar adapted to swing relative to the disk by centrifugal force, and spring means connected between the flywheel and the movable mass tending to return the mass to a predetermined at rest position.

2. Mechanism as claimed in claim 1 wherein the spring means comprises a plurality of series-connected springs connected between the wheel and the movable mass, and means pivoted to the wheel and connected to the springs at their intermediate junction.

3. Mechanism as claimed in claim 1 wherein the spring means comprises a plurality of series-connected springs, and a link pivotally connected at one end to the wheel and at the other end supporting the springs to maintain them in relative angular position.

4. Mechanism as claimed in claim 1 wherein the spring means comprises a pair of series-connected springs connected between the wheel and to the movable mass, and a link pivotally connected at one end to the wheel and at the other end to the junction of the springs whereby the springs are maintained in relative angular position.

5. Mechanism as claimed in claim 1 wherein the movable mass comprises a sector of an annulus, the concave surface of which is attached to the collar.

6. Mechanism as claimed in claim 1 wherein the movable mass comprises a substantially right angular sector of an annulus, the concave surface of which is attached to the collar.

7. Mechanism as claimed in claim 1 wherein stops are provided for limiting the movement of the movable weight as caused by the spring and centrifugal forces.

8. Mechanism as claimed in claim 1 wherein a fixed eccentric mass is secured to the wheel substantially diametrically opposite the at rest position of the movable mass.

ROBERT STROUD.

REFERENCES CITED

The following references are of record in the file of this patent:

UNITED STATES PATENTS

| Number | Name | Date |
|---|---|---|
| 1,403,923 | Thompson | Jan. 17, 1922 |
| 2,372,791 | Munro | Apr. 3, 1945 |
| 2,403,502 | Cook | July 9, 1946 |